2,986,491

PRODUCTION OF PESTICIDAL COMPOUNDS

Arthur Goldman and Sidney B. Richter, Chicago, Ill., assignors to Velsicol Chemical Corporation, Chicago, Ill., a corporation of Illinois No Drawing. Filed Jan. 2, 1959, Ser. No. 784,425

11 Claims. (Cl. 167—30)

This invention relates to new compositions of matter. More specifically, this invention relates to chemical compounds of the general formula

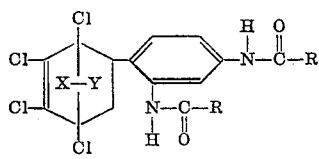

wherein X and Y are selected from the group consisting of hydrogen and chlorine atoms and R is a hydrocarbon radical containing from 1 to 15 carbon atoms. These new compounds are diamides which have been found useful as pesticides, particularly as fungicides and nematocides.

The compounds of this invention can be prepared readily by treatment of the corresponding chlorinated diaminophenylbicycloheptene with the appropriate acid halide

(X is halogen and R is as defined above), in the presence of a basic condensing agent such as pyridine, sodium hydroxide, potassium hydroxide, or the like. About two moles of acid halide are used for each mole of the diamine compound, and about one mole of condensing agent is used for each atom of halogen in the acid halide. The reaction can be carried out conveniently in a relatively inert solvent such as benzene or toluene. Although the reaction often takes place satisfactorily at normal room temperature, the reaction mixture can be heated, if desired, to complete the reaction. Frequently, the product separates from the reaction mixture as soon as the starting materials are mixed, but the product is preferably isolated by distilling off the solvent and washing the residue with water to remove water-soluble substances. The water-washed residue is often sufficiently pure to be used directly for pesticidal purposes, but it can be purified, for example, by crystallization from a suitable solvent.

A wide variety of acid halides can be used as starting materials in preparing the compounds of this invention. These acid halides are either chemicals of commerce or can be prepared readily, as for example by treatment of the corresponding carboxylic acids with such reagents as $PCl_5$, $PCl_3$, $PBr_3$, $SOCl_2$, or the like in the conventional manner. While the acid halides are generally suitable reactants, the acid chlorides are preferred because of their more ready availability. For example, such straight-chain, saturated aliphatic acid chlorides as the acetyl, proprionyl, butyryl, valeryl, caproyl, enantheyl, caprylyl, pelargonyl, capryl, hendecanoyl, lauroyl, tridecanoyl, myristoyl, pentadecanoyl, and palmitoyl chlorides can be used. Their use will produce compounds according to this invention in which R is a straight-chain saturated aliphatic hydrocarbon radical. Similarly, such various branched-chain, saturated aliphatic acid chlorides as α-methylcaproyl chloride, pivalyl chloride, α,β-dimethylbutyryl chloride, α-methyllauroyl chloride, isobutyryl chloride, and α-ethylvaleryl chloride can be used as starting materials. Their use will produce compounds according to this invention in which R is a branched-chain, saturated aliphatic hydrocarbon radical.

Acid halides which have in their hydrocarbon radicals either double or triple bonds or multiple unsaturation can also be used. Typical of such acid halides are acrylyl chloride, methacrylyl chloride, senecioyl chloride, sorbyl chloride, propriolyl chloride, 2-decenoyl chloride, and crotonyl chloride. Their use will produce compounds according to this invention in which R is an unsaturated aliphatic hydrocarbon radical. In addition, compounds according to this invention can be prepared in which R is a cyclic aliphatic hydrocarbon radical by the use of such acid halides as cyclopentanecarbonyl chloride, 1-cyclopentene-1-carbonyl chloride, cyclohexanecarbonyl chloride, 1-cyclohexene-1-carbonyl chloride, and the like.

Alternately, various aromatic acid halides such as benzoyl chloride, o-ethylbenzoyl chloride, o-toluyl chloride, β-isodurylyl chloride (2,4,6-trimethylbenzoyl chloride), 4-ethyl-m-toluyl chloride, 2,3-dimethylbenzoyl chloride, 2,6-dimethylbenzoyl chloride, 3,5-dimethylbenzoyl chloride, 1-naphthoyl chloride, 2-naphthoyl chloride, p-butylbenzoyl chloride, m-isopropylbenzoyl chloride, 2,4,6-triethylbenzoyl chloride, p-sec-butylbenzoyl chloride, p-(1-methylbutyl)-benzoyl chloride, and the like can also be used. Their use will produce compounds according to this invention in which R is an aromatic hydrocarbon radical.

The chlorinated 2,4-diaminophenylbicycloheptenes also employed as starting materials in the preparation of the compounds of this invention can be obtained readily by the reduction of the corresponding dinitro compounds, which themselves are prepared by nitrating the Diels-Alder adduct of styrene and the appropriate chlorinated cyclopentadiene. Thus, compounds of this invention in which both X and Y are chlorine atoms are prepared by first preparing the Diels-Alder adduct of styrene with hexachlorocyclopentadiene. Similarly, compounds in which one of X or Y is a chlorine atom and the other is a hydrogen atom can be obtained by starting the synthesis with the Diels-Alder adduct of styrene with 1,2,3,4,5 - pentachloro - 1,3-cyclopentadiene. Compounds in which both X and Y are hydrogen atoms can be obtained by starting the synthesis with the Diels-Alder adduct of styrene with 1,2,3,4-tetrachloro-1,3-cyclopentadiene. The required penta- and tetrachlorocyclopentadienes can be obtained, for example, by the reduction of hexachlorocyclopentadiene by catalytic hydrogenation in the presence of a platinum or palladium catalyst as described by McBee and Smith in the J. Am. Chem. Soc., vol. 77, page 389, 1955.

The aforementioned Diels-Alder adductions can be carried out using the chlorinated cyclopentadiene reactant as a solvent, and the adduction temperatures can vary from about 70° to about 220° C. The ratio of reactants should be at least equimolar, but an excess of the chlorinated cyclopentadiene can be used. Alternately, other inert solvents can also be utilized. The adduction time will vary with the temperature and diene but is generally from about 30 minutes to about 48 hours. When the adduct of the chlorinated cyclopentadiene with styrene has been prepared, it is then nitrated by treating it with fuming nitric acid in the presence of concentrated sulfuric acid. The dinitro compound which is obtained in this manner is then reduced to the desired diamino compound by treatment, for example, with iron and concentrated hydrochloric acid.

The manner in which the novel compounds of this invention can be prepared and used is illustrated in the following examples:

EXAMPLE 1

*Preparation of the adduct from styrene and hexachlorocyclopentadiene*

Styrene (520.7 g.; 5 moles) was added slowly with stirring over a period of 3 hours below the surface of hexachlorocyclopentadiene (1364 g.; 5 moles) in a glass reaction vessel equipped with a mechanical stirrer, reflux condenser, internal thermometer, dropping funnel, and electric heating mantle. The temperature of the reaction mixture was maintained at 110–125° C. during the addition. The reaction product was recrystallized from methanol to give 1736 g. of crystalline 1,2,3,4,7,7-hexachloro-5-phenylbicyclo(2.2.1)-2-heptene, melting at 73.0–74.0° C.

EXAMPLE 2

*Preparation of the adducts from styrene and tetra- or pentachlorocyclopentadiene*

The reactions are carried out as described in Example 1, with the substitution of 5 moles of 1,2,3,4-tetrachloro-1,3-cyclopentadiene or 1,2,3,4,5-pentachlorocyclopentadiene for the hexachlorocyclopentadiene. The resulting products are 1,2,3,4-tetrachloro-5-phenylbicyclo(2.2.1)-2-heptene and 1,2,3,4,7-pentachloro-5-phenylbicyclo(2.2.1)-2-heptene, respectively.

EXAMPLE 3

*Nitration of the hexachlorocyclopentadiene-styrene adduct*

1,2,3,4,7,7-hexachloro-5-phenylbicyclo(2.2.1)-2-heptene (1005 g.; 2.66 moles) and 1700 ml. of concentrated sulfuric acid (specific gravity 1.84) were placed in a glass reaction vessel fitted with a mechanical stirrer, internal thermometer, reflux condenser, dropping funnel, and heating mantle. The mixture was heated to 85° C. and then stirred and maintained at a temperature of 85–90° C. by external cooling while 750 ml. of fuming nitric acid (specific gravity 1.50) was added uniformly over a two-hour period. An additional 150 ml. of fuming nitric acid was then added while the temperature of the reaction mixture was maintained at 95–110° C. After the addition, the mixture was stirred at this temperature for 6 hours and then cooled. The acid layer was decanted, and the solid product was washed, first with water, then with sodium bicarbonate solution, and finally with water. The solid was then air dried and recrystallized from isopropyl alcohol to give 923 g. of 1,2,3,4,7,7-hexachloro-5-(2,4-dinitrophenyl)bicyclo(2.2.1)-2-heptene, melting at 180.5–182° C. The pure product was analyzed for $$C_{13}H_6Cl_6N_2O_4$$

Theory: C, 33.42%; H, 1.30%; Cl, 45.53%. Found: C, 33.49%; H, 1.39%; Cl, 45.77%.

EXAMPLE 4

*Reduction of the nitrated adduct of styrene and hexachlorocyclopentadiene*

1,2,3,4,7,7-hexachloro-5-(2,4-dinitrophenyl)-bicyclo-(2.2.1)-2-heptene (95 g.; 0.203 mole), 400 ml. benzene, and 50 ml. water were placed in a glass reaction vessel fitted with a mechanical stirrer, internal thermometer, reflux condenser, and heating mantle. The mixture was then refluxed and stirred vigorously while iron powder (200 g.) "reduced by hydrogen" was added over a period of 15–20 minutes. The vessel was fitted with a dropping funnel, and 50 ml. of concentrated hydrochloric acid was added dropwise over a period of one hour, after which the reaction mixture was stirred and refluxed for an additional three hours. The hot mixture was filtered, and the solid was washed with benzene. The combined washings and filtrate were washed with water, treated with activated carbon and concentrated by evaporation to about 20% of their original volume. Heptane (3 liters) was added, and the mixture was concentrated by evaporation to about 50% of its volume to remove any traces of benzene. The cooled residue was filtered to give 58 g. of 1,2,3,4,7,7-hexachloro-5-(2,4-diaminophenyl)bicyclo(2.2.1)-2-heptene, melting at 167–168° C. The pure product was analyzed for $C_{13}H_{10}Cl_6N_2$.

Theory: C, 38.35%; H, 2.48%; Cl, 52.27%; N, 6.88%. Found: C, 38.47%; H, 2.57%; Cl, 52.20%; N, 6.90%.

EXAMPLE 5

*Reduction of the nitrated adducts of styrene and tetra- or pentachlorocyclopentadiene*

The adducts prepared as described in Example 2 are nitrated and reduced in the manner detailed in Examples 3 and 4 to give 1,2,3,4-tetrachloro- and 1,2,3,4,7-pentachloro-5-(2,4-diaminophenyl)bicyclo(2.2.1)-2-heptene.

EXAMPLE 6

*Preparation of 1,2,3,4,7,7-hexachloro-5-(2,4-diacetamidophenyl)bicyclo(2.2.1)-2-heptene*

Acetyl chloride (11.6 g.; 0.148 mole) was added dropwise with stirring to a solution of 1,2,3,4,7,7-hexachloro-5-(2,4-diaminophenyl)bicyclo(2.2.1) - 2 - heptene (30 g.; 0.074 mole) and pyridine (12 g.) in 200 ml. benzene in a 300-ml., round-bottomed flask fitted with a mechanical stirrer, reflux condenser, and dropping funnel. A dark oily substance and a copious yellow precipitate of pyridine hydrochloride came out of solution immediately upon the addition of the acid chloride. The benzene was distilled in vacuo to leave a residual oil and solid, which were washed several times with hot water. After the water washing, the oil solidified to a dark brown mass, which was treated with activated charcoal and recrystallized from an ethanol-water mixture to give 21.2 g. (58% of theory) of yellow 1,2,3,4,7,7-hexachloro-5-(2,4-diacetamidophenyl)bicyclo(2.2.1) - 2 - heptene, melting at 165–168° C.

*Analysis for 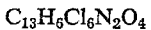*—Theory: C, 41.58%; H, 2.87%; Cl, 43.32%. Found: C, 41.87%; H, 3.46%; Cl, 43.22%.

EXAMPLE 7

*Preparation of 1,2,3,4,7,7-hexachloro-5-(2,4-diacrylylaminophenyl)bicyclo(2.2.1)-2-heptene*

Acrylyl chloride (13.4 g.; 0.148 mole), prepared as described by Stempel et al., J. Am. Chem. Soc. 72, 2299 (1950), was added dropwise with stirring to a solution of 1,2,3,4,7,7 - hexachloro-5-(2,4-diaminophenyl)bicyclo-(2.2.1)-2-heptene (30 g.; 0.074 mole) and pyridine (12 g.) in 200 ml. of benzene in a 300-ml., round-bottomed flask fitted with a mechanical stirrer, reflux condenser, and dropping funnel. A large amount of material came out of solution. The benzene was removed by distillation in vacuo, and the residue was washed several times with water to remove the pyridine hydrochloride. The final water wash was decanted to leave a viscous, oily residue which solidified to a crude, yellow solid on standing. The solid was recrystallized from nitromethane to give 20 g. (53% of theory) of yellow 1,2,3,4,7,7-hexachloro - 5 - (2,4 - diacrylylaminophenyl)bicyclo(2.2.1)-2-heptene, melting at 155° C. (decomposition).

*Analysis for $C_{19}H_{14}Cl_6N_2O_2$.*—Theory: C, 44.30%; H, 2.74%; Cl, 41.30%; N, 5.44%. Found: C, 44.51%; H, 2.58%; Cl, 40.83%; N, 5.31%.

EXAMPLE 8

*Preparation of 1,2,3,4,7,7-hexachloro-5-(2,4-dilauroylaminophenyl)bicyclo(2.2.1)-2-heptene*

Lauroyl chloride (32.5 g.; 0.15 mole), prepared as described by Ralston and Selby in J. Am. Chem. Soc. 61, 1019 (1939), was added slowly with stirring to a solution of 1,2,3,4,7,7-hexachloro-5-(2,4-diaminophenyl)bicyclo(2.2.1)-2-heptene (30 g.; 0.074 mole) and pyridine (12.5 g.) in 200 ml. of benzene in apparatus as described in the previous example. A precipitate of pyridine hydrochloride separated immediately and was filtered off. The solvent was distilled in vacuo from the filtrate to leave a dark, waxlike solid, which was repeatedly crystallized from an ethanol-water mixture to give white 1,2,3,4,7,7-hexachloro-5-(2,4-dilauroylaminophenyl)bicyclo(2.2.1)-2-heptene, melting at 99.0–100.5° C.

Analysis for $C_{37}H_{54}Cl_6N_2O_2$.—Theory: C, 57.59%; H, 7.05%; Cl, 27.57%; N, 3.63%. Found: C, 57.33%; H, 6.95%; Cl, 27.58%; N, 3.20%.

A wide variety of other useful compounds within the scope of this invention can be prepared according to the process detailed in the above examples. Given in the following examples are the acid halide employed as starting material, the particular halogenated diaminophenylbicycloheptene utilized, and the name of the compound of this invention which is obtained, respectively. For brevity, the required halogenated diaminophenylbicycloheptenes, prepared as described in Examples 4 and 5, are identified as follows: (A) 1,2,3,4-tetrachloro-, (B) 1,2,3,4,7-pentachloro-, and (C) 1,2,3,4,7,7-hexachloro-5-(2,4-diaminophenyl)bicyclo(2.2.1)-2-heptene.

EXAMPLE 9

Proprionyl chloride+B=1,2,3,4,7-pentachloro-5-(2,4-diproprionylaminophenyl)bicyclo(2.2.1)-2-heptene.

EXAMPLE 10

α-Methylcaproyl chloride+B=1,2,3,4,7-pentachloro-5-[2,4-bis-(α-methylcaproylamino)phenyl]bicyclo(2.2.1)-2-heptene.

EXAMPLE 11

Methacrylyl chloride+C=1,2,3,4,7,7-hexachloro-5-[2,4-bis-(methacrylylamino)phenyl]bicyclo(2.2.1)-2-heptene.

EXAMPLE 12

Cyclopentanecarbonyl chloride+C=1,2,3,4,7,7-hexachloro-5-[2,4-bis-(cyclopentanecarboxamino)phenyl]bicyclo(2.2.1)-2-heptene.

EXAMPLE 13

Benzoyl chloride+B=1,2,3,4,7-pentachloro-5-(2,4-dibenzamidophenyl)bicyclo(2.2.1)-2-heptene.

EXAMPLE 14

Butyryl chloride+C=1,2,3,4,7,7-hexachloro-5-(2,4-dibutyrylaminophenyl)bicyclo(2.2.1)-2-heptene.

EXAMPLE 15

Pivalyl chloride+C=1,2,3,4,7,7-hexachloro-5-(2,4-dipivalylaminophenyl)bicyclo(2.2.1)-2-heptene.

EXAMPLE 16

Senecioyl chloride+B=1,2,3,4,7-pentachloro-5-(2,4-disenecioylaminophenyl)bicyclo(2.2.1)-2-heptene.

EXAMPLE 17

1-cyclopentene-1-carbonyl chloride+B=1,2,3,4,7-pentachloro-5-[2,4-bis-(1-cyclopentene-1-carboxamino)phenyl]bicyclo(2.2.1)-2-heptene.

EXAMPLE 18 o-Ethylbenzoyl chloride+A=1,2,3,4-tetrachloro-5-[2,4-bis(o-ethylbenzamido)phenyl]bicyclo(2.2.1)-2-heptene.

EXAMPLE 19

4-ethyl-m-toluyl chloride+A=1,2,3,4-tetrachloro-5-[2,4-bis-(4-ethyl-m-toluylamino)phenyl]bicyclo(2.2.1)-2-heptene.

EXAMPLE 20

1-naphthoyl chloride+B=1,2,3,4,7-pentachloro-5-(2,4-di-1-naphthoylaminophenyl)bicyclo(2.2.1)-2-heptene.

EXAMPLE 21

Valeryl chloride+B=1,2,3,4,7-pentachloro-5-(2,4-divalerylaminophenyl)bicyclo(2.2.1)-2-heptene.

EXAMPLE 22

α,β-Dimethylbutyryl chloride+A=1,2,3,4-tetrachloro-5-[2,4-bis(α,β-dimethylbutyrylamino)-phenyl]bicyclo(2.2.1)-2-heptene.

EXAMPLE 23

Sorbyl chloride+A=1,2,3,4-tetrachloro-5-(2,4-disorbylaminophenyl)bicyclo(2.2.1)-2-heptene.

EXAMPLE 24

Cyclohexanecarbonyl chloride+C=1,2,3,4,7,7-hexachloro-5-[2,4-bis(cyclohexanecarboxamino)phenyl]bicyclo(2.2.1)-2-heptene.

EXAMPLE 25

β-Isodurylyl chloride+B=1,2,3,4,7-pentachloro-5-[2,4-bis-(β-isodurylylamino)phenyl]bicyclo(2.2.1)-2-heptene.

EXAMPLE 26

Pelargonyl chloride+A=1,2,3,4-tetrachloro-5-(2,4-dipelargonylaminophenyl)bicyclo(2.2.1)-2-heptene.

EXAMPLE 27

Proprioly1 chloride+C=1,2,3,4,7,7-hexachloro-5-(2,4-diproprioly1aminophenyl)bicyclo(2.2.1)-2-heptene.

EXAMPLE 28

2,4,6-triethylbenzoyl chloride+C=1,2,3,4,7,7-hexachloro-5-[2,4-bis-(2,4,6-triethylbenzamido)phenyl]bicyclo(2.2.1)-2-heptene.

EXAMPLE 29

Myristoyl chloride+B=1,2,3,4,7-pentachloro-5-(2,4-dimyristoylaminophenyl)bicyclo(2.2.1)-2-heptene.

EXAMPLE 30

α,α-Dibutylcaproyl chloride+C=1,2,3,4,7,7-hexachloro-5-[2,4-bis-(α,α-dibutylcaprylamino)phenyl]bicyclo(2.2.1)-2-heptene.

EXAMPLE 31

Palmitoyl chloride+C=1,2,3,4,7,7-hexachloro-5-(2,4-dipalmitoylaminophenyl)bicyclo(2.2.1)-2-heptene.

EXAMPLE 32

2-decenoyl chloride+A=1,2,3,4-tetrachloro-5-[2,4-bis-(2-decenoylamino)phenyl]bicyclo(2.2.1)-2-heptene.

EXAMPLE 33 o-Toluyl chloride+C=1,2,3,4,7,7-hexachloro-5-(2,4-di-o-toluylaminophenyl)bicyclo(2.2.1)-2-heptene.

The compounds of this invention have been found to be excellent pesticides. For example, the toxicity of such compounds to spores of fungi was determined by the slide germination technique adopted by the Committee on Standardization of Fungicidal Tests of the American Phytopathological Society. Measured concentrations of spores were placed on glass slides in contact with various concentrations of the compound being tested. Percentage germination of spores was then determined for each treatment after 24 hours' incubation at 72° F. Three replicates were run at each concentration. Typical of the results obtained were the following observed with the product of Example 7, namely 1,2,3,4,7,7-hexachloro-5-(2,4-diacrylylaminophenyl)bicyclo(2.2.1)-2-heptene.

| Organism | Concentration p.p.m. | Percent Spore Germination | | | ED 50, p.p.m. |
|---|---|---|---|---|---|
| Fusarium roseum | 100 | 1 | 0 | 1 | 42 |
| Monilinia fructicola | 100 | 0 | 0 | 0 | 12 |
| Stemphylium sarcinaeforme | | -- | -- | -- | 32 |

A series of experiments were also carried out for the systemic control of bean rust (*Uromyces phaseoli*) on pinto beans. Pinto bean seedlings, 5 to 7 days old, were uprooted, washed free of soil particles, and placed in aqueous dispersions of the test compounds at various concentrations. The containers for the respective test compounds were wrapped in aluminum foil to preclude light. After 96 hours of exposure to the test compounds, the plants were inoculated with the bean rust organism, held in an inoculation chamber for 24 hours, and then removed to greenhouse conditions. The effectiveness of the treatments was determined by the number of rust postules present 7 to 10 days following inoculation. At a concentration of 100 p.p.m., the product of Example 7 gave complete control of the bean rust and thus showed an ED 95 of less than 100 p.p.m.

In addition to their value as fungicides, compounds of this invention also have nematocidal activity. In experiments for control of the nematode *Panagrellus redivivus*, for example, acetone solutions of various compounds were dispersed in water with not more than 4 percent acetone by volume in the acetone phase, 4.5 ml. of which were then placed in respective 20 x 75 mm. vials. From 150 to 200 nematodes, 0.5 ml. by volume, were then introduced into the test solutions. Test vials for one compound only were placed in an individual water-sealed moisture chamber. A control vial of water only plus nematodes was placed in each moisture chamber. Vapor phase toxicity of a given compound was determined by the mortality induced in the control vials (water only plus nematodes) for that particular chamber. Contact toxicity was determined by mortality induced in the test compound vials per se. The results were expressed as percent living nematodes after indicated periods of exposure. In these experiments, 1,2,3,4,7,7-hexachloro-5-(2,4-diacrylylaminophenyl)bicyclo(2.2.1)-2-heptene, for example, used at a concentration of 100 p.p.m. showed only 0–5% nematodes alive after 24 hours, while all were dead after 48 hours. Further similar experiments indicated that this compound had an ED 50 of 3 p.p.m.

Pesticidal compositions of this invention are prepared by mixing one or more of the new compounds of this invention with inert carries to provide formulations adapted for ready and efficient application with conventional applicator equipment to the site of the pest infestation. For example, fungicidal or nematocidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like, so that they can be used directly as solutions in these substances. However, the pesticidal compositions of this invention can also contain a surface-active agent of the kind used in the art to enable the active compounds to be readily dispersed in water or other liquids to give aqueous sprays, which are a preferred method of applying the active compounds of this invention. The surface-active agents can be of the anionic, cationic or nonionic types. Typical examples of such surface-agents are sodium stearate, potassium laurate, morpholine oleate, sodium lauryl sulfate, sodium 2-ethylhexyl sulfate, sodium xylenesulfonate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal composition. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 34

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| 1,2,3,4,7,7 - hexachloro - 5 - (2,4 - diacrylylamino phenyl)-bicyclo (2.2.1)-2-heptene | 25 |
| Sodium lauryl sulfate | 2 |
| Sodium lignin sulfonate | 3 |
| Kerosene | 70 |

EXAMPLE 35

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| 1,2,3,4,7,7 - hexachloro - 5 - (2,4 - diacetamidophenyl)-bicyclo(2.2.1)-2-heptene | 75 |
| Fuller's earth | 22.75 |
| Sodium lauryl sulfate | 2 |
| Methyl cellulose | .25 |

EXAMPLE 36

*Preparation of an oil-dispersible powder*

The following components are blended and ground as described in the previous example to give a powder which can be dispersed in oil to form a spray containing the desired concentration of active compound.

| | |
|---|---|
| 1,2,3,4,7,7 - hexachloro - 5 - (2,4 - dilauroylaminophenyl)-bicyclo(2.2.1)-2-heptene | 70 |
| Condensation product of diamylphenol with ethylene oxide | 4 |
| Fuller's earth | 26 |

EXAMPLE 37

*Preparation of a dust*

The following ingredients are mixed thoroughly and then ground to an average particle size of less than about 50 microns to give a dust suitable for application with conventional dusting equipment.

1,2,3,4 - tetrachloro - 5 - (2,4 - dipelargonylamino-
  phenyl)-bicyclo(2.2.1)-2-heptene _____ 20
Talc _____ 80

EXAMPLE 38

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

1,2,3,4,7 - pentachloro - 5 - (2,4 - dibenzamidophen-
  yl)-bicyclo(2.2.1)-2-heptene _____ 10
Fuller's earth _____ 66
Dextrin _____ 20
Sodium lignin sulfonate _____ 3
Kerosene _____ 1

When the compounds and compositions of this invention are used as fungicides to control or prevent plant diseases caused by fungi or bacteria, they are used in several ways, depending on the particular chemical, the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease.

The compounds of this invention can be useful in any one or more of the above ways, but since it is much easier to protect plants from disease rather than to cure disease, the chemicals are best used in the form of protectants. These protective chemicals can act to prevent sporulation and thus reduce or eliminate the inoculum necessary for the spread of a disease. They can also prevent spores from completing their germination or incubation stage so that no infection ensues. These eradicant chemicals, which can also be considered broadly as protectants, are used to destroy disease-producing organisms or their inoculum in the soil, in dead plant organs, or on living plant tissue. When used to treat soil or seed, these compounds are usually referred to as disinfectants or disinfestants. The compounds of this invention are also useful for the control of fungal growth on wood, plastics, textiles, and like materials.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in greenhouses, cold frames, hotbeds, and seedbeds.

Both solid and liquid compositions of the compounds of this invention can be used in such soil treatments, which are also effective for soil nematode control. Plant treatments by chemicals in the form of liquid or solid fungicidal compositions are made on growing crops or on crop residues either to prevent the appearance or spread of diseases or to destroy the disease-causing organisms already present or both. This type of treatment is essential for plant protection from air-borne pathogenes and is also useful in controlling many seed- and soil-borne pathogenes that spread externally to the upper parts of plants. Such treatment includes the application of the active chemicals internally to prevent or destroy diseased conditions.

The active compounds of this invention are applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compounds.

We claim:

1. A compound of the general formula

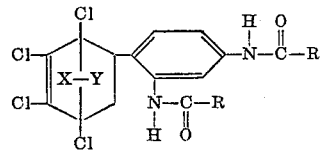

wherein X and Y are selected from the group consisting of hydrogen and chlorine atoms and R is a hydrocarbon radical containing from one to fifteen carbon atoms selected from the group consisting of saturated aliphatic radicals, unsaturated aliphatic radicals, and aromatic radicals and their monochlorinated derivatives, any ring portion thereof containing not more than six carbon atoms.

2. A compound as described in claim 1, wherein the hydrocarbon radical is a saturated aliphatic hydrocarbon radical.

3. A compound as described in claim 1, wherein the hydrocarbon radical is an unsaturated aliphatic hydrocarbon radical.

4. A compound as described in claim 1, wherein the hydrocarbon radical is an aromatic hydrocarbon radical.

5. 1,2,3,4-tetrachloro-5-(2,4-dipelargonylaminophenyl) bicyclo(2.2.1)-2-heptene.

6. 1,2,3,4,7-pentachloro - 5-(2,4 - dibenzamidophenyl) bicyclo(2.2.1)-2-heptene.

7. 1,2,3,4,7,7 - hexachloro - 5-(2,4-diacetamidophenyl) bicyclo(2.2.1)-2-heptene.

8. 1,2,3,4,7,7 - hexachloro - 5 - (2,4-diacrylylaminophenyl)bicyclo (2.2.1)-2-heptene.

9. 1,2,3,4,7,7 - hexachloro - 5 - (2,4-dilauroylaminophenyl)bicyclo(2.2.1)-2-heptene.

10. A fungicidal and nematocidal composition comprising an inert carrier and a toxic amount of a compound of claim 1.

11. A method of destroying undesirable fungi and nematodes which comprises contacting these pests with a fungicidal and nematocidal composition comprising an inert carrier and as the essential active ingredient, in a quantity which is injurious to said pests, a compound of claim 1.

References Cited in the file of this patent

UNITED STATES PATENTS

| | | |
|---|---|---|
| 2,616,825 | Albert | Nov. 4, 1952 |
| 2,638,431 | Harry | May 12, 1953 |
| 2,681,931 | Jenkins | June 22, 1954 |
| 2,872,483 | Bloch | Feb. 3, 1959 |
| 2,901,510 | Molotsky et al. | Aug. 25, 1959 |

OTHER REFERENCES

Organic Compounds, by Wild (1948), pp. 209, 217–219.